United States Patent [19]

Read et al.

[11] Patent Number: 4,517,340
[45] Date of Patent: May 14, 1985

[54] ADHESIVE COMPOSITION

[75] Inventors: Michael R. Read, Whelford, Nr. Fairford, England; Nicholas T. Corke, Keerbergen, Belgium

[73] Assignee: Raychem Corporation, Menlo Park, Calif.

[21] Appl. No.: 630,335

[22] Filed: Jul. 12, 1984

Related U.S. Application Data

[63] Continuation of Ser. No. 411,246, Aug. 25, 1982, abandoned.

[51] Int. Cl.³ .......................... C08F 8/00; C08L 63/00
[52] U.S. Cl. ..................................... 525/113; 525/119; 525/120; 264/230
[58] Field of Search .................... 525/113, 119, 120

[56] References Cited

U.S. PATENT DOCUMENTS

| | | | |
|---|---|---|---|
| 2,987,492 | 6/1961 | Pinder | 525/119 |
| 3,641,195 | 2/1972 | Ball et al. | 525/113 |
| 4,018,733 | 3/1977 | Lopez et al. | 525/113 |
| 4,122,128 | 10/1978 | Lehmann et al. | 525/113 |

FOREIGN PATENT DOCUMENTS

| | | | |
|---|---|---|---|
| 229429 | 4/1959 | Australia | 525/421 |
| 2226399 | 5/1973 | Fed. Rep. of Germany | 525/113 |
| 47-40320 | 12/1972 | Japan | 525/113 |
| 1370782 | 10/1974 | United Kingdom | 525/113 |
| 2055109A | 2/1981 | United Kingdom | 525/113 |

OTHER PUBLICATIONS

Detroit Society for Paint Technology, Journal of Paint Technology, pp. 30–37, vol. 44, No. 565, (1972).

Primary Examiner—John C. Bleutge
Assistant Examiner—A. L. Carrillo
Attorney, Agent, or Firm—James G. Passé; Edith A. Rice; Herbert G. Burkard

[57] ABSTRACT

An adhesive composition comprises
(a) a thermoplastic polyamide having reactive amine groups;
(b) a thermoplastic copolymer of an alkene with an ethylenically unsaturated ester of an alkanol and a carboxylic acid, e.g. vinyl acetate or ethyl acrylate, and optionally one or more acidic copolymers; and
(c) a thermoplastic epoxy resin.

The components (a) and (b) are present in a ratio of from 35:65 to 75:25 by weight and component (c) is present in an amount of from about 8 to 79 parts per hundred parts of components (a) and (b) by weight, components (a), (b) and (c) existing separately in the form of particles that are mixed together.

9 Claims, No Drawings

ADHESIVE COMPOSITION

This application is a continuation of application Ser. No. 411,246, filed Aug. 25, 1982, now abandoned.

This invention relates to adhesives and to dimensionally recoverable articles containing such adhesives.

In many fields of application of adhesives it is desirable to provide an adhesive that will be activated by heat and will provide a strong bond between substrates both in the shear mode and in the peel mode. In such applications hot-melt adhesives have gained widespread use on account of their good bonding characteristics and ease of application. However, hot-melt adhesives, by their nature, will not exhibit high bond strengths at high temperatures, eg. in the region of their melting or softening points. For high temperature applications therefore, curable adhesives such as epoxy adhesives have been used. However, whilst these adhesives exhibit very high bond strengths in the shear mode, their bond strength in the peel mode is extremely poor, often less than $1N(25\ mm)^{-1}$ due to their brittleness, and so are completely unsuitable for many uses.

According to one aspect of the present invention, there is provided an adhesive composition which comprises:

(a) a thermoplastic polyamide having reactive amine groups;
(b) a thermoplastic copolymer of an alkene with an ethylenically unsaturated ester of an alkanol and a carboxylic acid, the ester having up to 6 carbon atoms, and optionally one or more acidic comonomers; and
(c) a thermoplastic epoxy resin;

components (a) and (b) being present in a ratio of from 35:65 to 75:25 by weight and component (c) being present in an amount of from 8 to 79 parts per hundred parts of components (a) and (b) by weight, components (a), (b) and (c) existing separately from one another in the form of particles that are mixed together.

Preferably the components (a) and (b) are present in a ratio of from about 35:65 to 65:35, more preferably from about 4:6 to 6:4, especially from about 45:55 to 55:45 and most especially about 50:50 by weight.

The adhesive composition may be employed in the same manner as a conventional hot-melt adhesive, e.g. by applying it to one or both of the substrates to be bonded, bringing the substrates together and heating the adhesive, in this case to cause the particles to fuse. On heating the components (a), (b) and (c) react together to form a crosslinked network that is either infusible or has a melting or softening point that is significantly higher than the initial melting or softening point of the components, for example 30° higher or even more. Often the softening points of the installed adhesive may be as high as 50° C. above the softening point of the initial components for example the softening point may be raised from a value of 90 to 95° C. up to 140° C. or higher. This increase in melting or softening point of the adhesive allows the adhesive to be used in conditions where it will be exposed to temperatures higher than its initial melting or softening point and so combines low initial application temperatures with high installed use temperatures.

Another advantage of the compositions according to the invention is that, whilst they exhibit high bond strengths in the shear mode, they also exhibit surprisingly high bond strengths in the peel mode at elevated temperatures, for example in the order of 80 to $90N(25\ mm)^{-1}$ or more at 70° C. between polyethylene substrates. This is in contrast with conventional epoxy adhesives which exhibit very low peel strengths. Furthermore, the cured adhesives have low impact brittleness points (e.g. −5° to −10° C.).

The polyamides that are most suitable for forming component (a) of the adhesive compositions are those polyamides that are conventionally used to form hot-melt adhesives. These polyamides are characterized by the fact that their amide linkages are separated by an average of at least fifteen carbon atoms and have amorphous structures in contrast with the more highly crystalline, fibre forming polyamides such as nylon 6 or nylon 6.6.

In general, any dicarboxylic acid in which the carboxylic acid groups are separated by a bivalent hydrocarbon group which may be saturated or unsaturated, aliphatic, aromatic or cycloaliphatic or which may have two or more aliphatic, aromatic or cycloaliphatic moieties, can be used to form the polyamides. Where long chain diamines are used, that is diamines having chains of at least fifteen carbon atoms separating the nitrogen atoms, dicarboxylic acids such as adipic, sebacic, suberic, succinic, glutaric, isophthalic, terephthalic and phthalic acids may be, and preferably are, used. Of the dicarboxylic acids, dimeric fatty acids are preferred. The term "dimeric fatty acid" is intended to include any acid obtained by dimerising saturated, ethylenically unsaturated or acetylenically unsaturated naturally occurring or synthetic monobasic aliphatic carrboxylic acids containing from 8 to 24 carbon atoms. Such dimeric fatty acids are fully described in U.S. Pat. No. 4,018,733, the disclosure of which is incorporated herein by reference.

In the diamines that may be used to form the polyamides, the nitrogen atoms are separated by a hydrocarbon group which may be aliphatic, cycloaliphatic or aromatic or may have a combination of any two or more aliphatic, cycloaliphatic or aromatic moietes and, in adition, it may contain ether linkages such as in the diamines prepared from diphenyl ether. Examples of such diamines include straight chain or branched alkylene diamines, having from 2 to 40 carbon atoms in the alkylene group, e.g. ethylene diamine, 1,3-diaminopropane, hexamethylene diamine, 9-aminomethylstearylamine and 10-aminoethylstearylamine; 1,3-di-4-piperidyl propane, diaminodicyclohexylmethane; methylene dianiline and bis(aminoethyl)diphenyl oxide. Dimeric fat diamines and "ether diamines" may also be used. These diamines are also described in U.S. Pat. No. 4,018,733 mentioned above, and U.S. Pat. No. 3,010,782, the disclosure of which is incorporated herein by reference. Usually the amine number of the polyamide will be at least 2, preferably at least 5 and especially at least 7 and may be as high as 44 or even higher. For example, the amine number may be as high as 55 or higher provided that the polyamide remains thermoplastic, the upper limit for the amine number usually being determined by the preferred melting or softening point of the polyamide.

As stated above, component (b) is a copolymer of an alkene with an ethylenically unsaturated alkanol/carboxylic acid ester containing up to 6 carbon atoms, the term "copolymer" as used herein being defined as including terpolymers and polymers formed from four or more comonomers. Thus, the copolymer may contain additional comonomers which are preferably acidic, e.g. are ethylenically unsaturated carboxylic acids, such as acrylic acid, and especially such that the copolymer has an acid number of at least 0.5, more especially at least 1 and most especially at least 3. In addition or alternatively the copolymer has an acid number of not more than 100. The alkene is preferably a $C_2$ to $C_6$ alkene, more preferably a C2 to C4 alkene, -alkenes being preferred e.g. 1-butene. The most preferred alkene however is ethylene. The preferred ethylenically unsaturated esters are vinyl acetate and ethyl acrylate. Examples of materials that may be used are described in the U.S. Pat. No. 4,018,733 to Lopez et al mentioned above.

Any of a number of thermoplastic epoxy resins may be used as component (c). The epoxy resin preferably has an epoxy number of at least 200, more preferably at least 500 and especially at least 800 mmol kg$^{-1}$. The upper limit for the epoxy number is determined by the melting or softening point of the resin, the higher the epoxy number the lower the melting or softening point thereof. The preferred resins will have an epoxy number of not more than 4000, especially not more than 3000 mmol kg$^{-1}$. Preferred epoxy resins are those based on bisphenol A or epoxy cresyl novolake resins and also multifunctional epoxy resins.

Whilst it has been observed that the peel strength of the adhesive generally increases with the epoxy resin content within the range of 8 to 79 parts per hundred parts of components (a) and (b), this increase is not very great and it is preferred that the composition contains not more than 70, more preferably not more than 60, especially not more than 50 and most especially not more than 40 parts of component (c) per hundred parts of the total of components (a) and (b) by weight. The components (a), (b) and (c) preferably each has a melting point in the range of from about 60° to about 120° C., more preferably from about 70° to about 120° C. and especially from about 70° to 100° C. Compositions based on such materials are found to cure when heated to the melting or softening point of the components but also to have good storage life, e.g. greater than 4 months, at storage temperatures as high as 40° to 50° C.

There is essentially no limit on the particle size of the reactive components in that the articles can still show a synergistic in rate and/or level of cure even with very large particles although the absolute value of the cure rate will decrease with large particles. Preferably the reactive components will have a weight average particle size of not more that 1000, especially not more than 500 and most especially not more than 300 micrometers. Preferably the reactive components have a weight average particle size of at least 1, more preferably at least 5 and especially at least 10 micrometers. The particle size of the reactive components may conveniently be adjusted by sieving the particles through an appropriately sized mesh in which case it is preferred that the particulate components are substantially free of particles greater than 500 micrometers in size. The preferred particle size ranges are from 5 to 300 and especially 10 to 200 micrometers.

A number of inert components may be incorporated in the compositions as long as they do not adversely affect the increase in rate or level of cure of the adhesive composition. Also it is preferred if they do not adversely affect the storage life of the adhesive.

According to another aspect of the invention there is provided a method of bonding a pair of surfaces together, which comprises (i) interposing between the surfaces an an adhesive composition which comprises:
(a) a thermoplastic polyamide having reactive amine groups;
(b) a thermoplastic copolymer of an alkene with an ethylenically unsaturated ester of an alkanol and a carboxylic acid, the ester having up to 6 carbon atoms, and optionally one or more acidic comonomers; and
(c) a thermoplastic epoxy resin;
components (a) and (b) being present in a ratio of from 35:65 to 75:25 by weight and component (c) being present in an amount of from 8 to 79 parts per hundred parts of components (a) and (b) by weight, components (a), (b) and (c) existing separately from one another in the form of particles that are mixed together. (ii) bringing the surfaces together; and (iii) heating the adhesive composition to cause the particles to fuse.

Because of the advantageous properties of the adhesive compositions according to the invention, especially their high temperature peel strength, the compositions are particularly suitable for use with dimensionally recoverable articles.

Dimensionally recoverable articles are articles having a dimensional configuration that may be made substantially to change when subjected to the appropriate treatment. Of particular interest are dimensionally heat-recoverable articles, the dimensional configuration of which may be made substantially to change when subjected to heat-treatment.

Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above a transition temperature thereof, for example, the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat to raise the temperature above the transition temperature will cause the article to assume its original heat-stable shape.

In other articles, as described, for example, in British Pat. No. 1,440,524, an elastomeric member such as an outer tubular member is held in a stretched state by a second member, such as in inner tubular member, which, upon heating weakens and thus allows the elastomeric member to recover.

Articles of this type have, in recent years, become widely used in a number of applications, for example for protecting objects such as electrical cables and cable splices or metal pipes from corrosion or other damage, for example damage caused by penetration of moisture.

The articles may be formed in a number of configurations depending on the particular use. They may be in the form of a tube that has been extruded and expanded radially to render it heat-recoverable, the tube being either in continuous lengths or discrete pieces and being coated on its internal surface with the adhesive compositions. Alternatively, the articles may be in the form of a sheet or tape that can be wrapped or wound around an object. More complex shapes, commonly referred to as boots, transitions, udders or caps, may be formed by moulding the articles in the desired configuration and then expanding them or by the methods described in our copending U.K. Application Nos. 8123069 and 8123072 (Ser. Nos. 2083403A and 2083859A). The present invention is also suitable for the production of wrap-around devices. So called wrap-around devices are employed for sealing, insulating or otherwise protecting a substrate where the use of a preformed tubular article such as a sleeve, is not possible or convenient e.g. in the case where the end of an elongate substrate is not accessible. In general, such wrap-around articles comprise at least a portion thereof which is adapted to be wrapped around a substrate to be covered and secured in tubular form by closure means. Thereafter, the wrap-around closure may be heat-recovered tightly onto the substrate by application of heat. Examples of wrap-around devices are described in U.S. Pat. Nos. 3,379,218, 3,455,326, 3,530,898, 3,542,079 and 3,574,318 the disclosures of which are incorporated herein by reference. Another form of wrap-around device in which the curable adhesive may be used is that described in U.K. patent application No. 8113486 (Ser. No. 2076694A) in which the curable adhesive is used to form a layer of sealant that may be peeled away at any desired point to expose a closure adhesive.

The adhesive composition may be coated on the heat-recoverable article in a number of ways depending on the type of article and adhesive composition. For example, where the article has an open, generally uniform configuration, it may be provided with a layer of tacky material for example pressure sensitive adhesive layer e.g. by spraying or in the form of a tape, and the adhesive composition may be applied as a powder to the pressure sensitive adhesive bearing portions of the article and compressed thereon by application of pressure. Alternatively, the powder may be compressed into a coherent layer and then bonded to the article by means of a tacky material. For either of these methods, pressures in the order of 0.8 MPa (120 p.s.i.) and temperatures of about 15° to 30° C. have been found to be most suitable. These methods of applying the adhesive composition are suitable for applications in which the adhesive contains no components other than the particulate reactive components in addition to those in which the adhesive does contain other components. In another method of applying the adhesive composition, the particulate reactive components are mixed with the other components which preferably comprise or include a pressure-sensitive adhesive or a mastic and the whole composition is pressed onto the heat-recoverable article or pressed into a coherent film which is then adhered to the heat-recoverable article, the temperatures and pressures used preferably being the same as those mentioned above.

Yet another method of application, which is suitable for coating the internal surfaces of tubes or moulded articles, comprises spraying the adhesive onto the appropriate parts of the article. The adhesive may be sprayed in the form of the dry powder onto a surface that is coated with a tacky material, e.g. a pressure sensitive adhesive, or the particulate reactive components may be dispersed in a non-solvent that contains a binder and, after the dispersion is sprayed onto the article, the non-solvent is allowed to evaporate.

The following Examples illustrate the invention:

EXAMPLES 1 TO 10

Samples of adhesive compositions according to the invention were prepared by cryogenically grinding a polyamide hot-melt adhesive or blend of adhesives, an ethylene copolymer and an epoxy resin, sieving the components to exclude particles of greater than 300 micrometers and mixing the particles together. The rolling drum peel strength of the adhesive was measured at 70° C. in accordance with the procedure described in U.S. Pat. No. 4,018,733 column 12.

The compositions and results are shown in Table I.

TABLE I

| Components | Trade name | EXAMPLE | | | | | | | | | |
|---|---|---|---|---|---|---|---|---|---|---|---|
| | | 1 | 2 | 3 | 4 | 5 | 6 | 7 | 8 | 9 | 10 |
| | | Comparison | | | Invention | | | | Comparison | | |
| | | Parts by weight | | | | | | | | | |
| Polyamide blend | Macromelt 6301 + Eurelon 100 (9:1) | 50 | 50 | 50 | 50 | 50 | 50 | 50 | 50 | 50 | 50 |
| E.V.A. | CXA 2002 | 50 | 50 | 50 | 50 | 50 | 50 | 50 | 50 | 50 | 50 |
| Epoxy resin | Epikote 1004 | 0 | 1 | 6 | 10 | 43 | 75 | 80 | 100 | 200 | 400 |
| Peel strength at 70° C./N (25 mm)$^{-1}$ | | 50 | 20 | 29 | 83 | 88 | 99 | 30 | Brittle Failure | | |

EXAMPLES 11 TO 26

The procedure of Examples 1 to 10 was repeated with a number of compositions to demonstrate the limits for the proportions of polyamide and ethylene copolymer. In addition to the peel strength, the lap shear strength of the adhesive was measured at 70° C. in accordance with ASTM-D638 between aluminium substrates. The results are shown in Table II.

TABLE II

| Components | Trade name | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|
| | | | | INVENTION | | | | | | | COMPARISON | | | | | | |
| | | | | | | | PARTS BY WEIGHT | | | | | | | | | | |
| Polyamide blend | Macromelt 6301 + Eurelon 100 | 70 | 60 | 50 | 50 | 40 | 100 | 80 | 80 | 70 | 60 | 50 | 40 | 30 | 30 | 20 | 20 |
| Epoxy resin | Epikote 1004 | | 10 | 10 | | 10 | | 10 | | | | | | 10 | | | 10 |
| Epoxy resin | Epikote 1001 | 10 | | | 10 | | | | | | | | | | | | |
| EVA | CXA 2002 du Pont | 30 | 40 | 50 | 50 | 60 | | 20 | 20 | 30 | 40 | 50 | 60 | 70 | 70 | 80 | 80 |
| Peel strength at 70° C./N (25 mm)$^{-1}$ | | 31 | 81 | 83 | 147 | 82 | 45 | 31 | 40 | 20 | 48 | 50 | 55 | 24 | 15 | 43 | 30 |
| Shear strength at 70° C./N (25 mm)$^{-2}$ | | | 543 | 515 | 840 | 690 | 358 | 620 | 550 | | 431 | 425 | 497 | | | 283 | 350 |

EXAMPLES 27 TO 32

The procedure of Examples 10 to 19 was repeated using a number of different ethylene copolymer components. The peel and shear strengths were measured at 70° C. and in each case the composition was compared with a corresponding composition containing no epoxy. The results are shown in Table III.

TABLE III

| Components | Trade name | EXAMPLE | | | | | | | | | | | |
|---|---|---|---|---|---|---|---|---|---|---|---|---|---|
| | | 27 | | 28 | | 29 | | 30 | | 31 | | 32 | |
| | | PARTS BY WEIGHT | | | | | | | | | | | |
| Polyamide blend | Macromelt 6301 + Eurelon 100 (9:1) | 50 | 50 | 50 | 50 | 50 | 50 | 50 | 50 | 50 | 50 | 50 | 50 |
| Epoxy resin | Epikote 1001 | | 10 | | | | | | | | | | |
| Epoxy resin | Epikote 1004 | 10 | | | 10 | | 10 | | 10 | 10 | | 10 | |
| EVA (acid No = 1) | Elvax 460 (du Pont) | 50 | 50 | 50 | | | | | | | | | |
| EVA (acid No = 6) | Elvax 4320 | | | | 50 | 50 | | | | | | | |
| EVA (acid No = 36) | CXA 2002 | | | | | | 50 | 50 | | | | | |
| Ethylene ethyl acrylate | DPD6169 (Union Carbide) | | | | | | | | 50 | 50 | | | |
| Ethylene butyl acrylate acrylic acid | Lupolene A2910 (BASF) | | | | | | | | | | 50 | 50 | |
| Ethylene acrylic acid | AC540A (Allied Chem) | | | | | | | | | | | | 50 | 50 |
| Peel strength at 70° C./N (25 mm)$^{-1}$ | | 40 | 56 | 9 | 70 | 9 | 49 | 46 | 56 | 6 | 29 | 29 | 31 | 35 |
| Shear strength at 70° C./N (25 mm)$^{-2}$ | | 505 | 404 | 374 | 323 | | 853 | 815 | 404 | 358 | | | | |

EXAMPLE 33

150 Parts of Versalon 1300 polyamide that had been modified by milling in 5% by weight of a reactive liquid polyamide sold under the trade name Versamid 100 and had been cryogenically ground to form a powder were mixed with 100 parts of a powdered ethylene-vinyl acetate-acid terpolymer sold under the trade name Elvax 4260, 80 parts of a bisphenol A epoxy resin sold by Shell Chemicals under the type No. Epikote 1004, and 6 parts of a dimethylaminopyridine accelerator. The powder was then seived to remove all particles greater than 300 micrometers in size.

We claim:

1. A dimensionally-recoverable article having on at least part of a surface thereof an adhesive composition which comprises:
(a) a thermoplastic polyamide having reactive amine groups;
(b) a thermoplastic copolymer of an alkene with an ethylenically unsaturated ester of an alkanol and a carboxylic acid, the ester having up to 6 carbon atoms, and optionally one or more acidic comonomers, said copolymer having an acid number of at least 1;
(c) an epoxy resin;
components (a) and (b) being present in a ratio of from 35:65 to 75:25 by weight and component (c) being present in an amount of from 8 to 79 parts per hundred parts of components (a) and (b) by weight, components (a), (b) and (c) existing separately from one another in the form of particles that are mixed together.

2. A composition as claimed in claim 1 wherein component (b) has an acid number of less than about 100.

3. A composition as claimed in claim 1, wherein the ethylenically unsaturated ester of component (b) is vinyl acetate or ethyl acrylate.

4. A composition as claimed in claim 1, wherein the alkene of component (b) is a $C_2$ to $C_4$ alkene.

5. A composition as claimed in claim 4, wherein the alkene of component (b) is ethylene.

6. A composition as claimed in claim 1, wherein components (a) and (b) are present in a ratio of from about 35:65 to 65:30 by weight.

7. A composition as claimed in claim 6, wherein components (a) and (b) are present in a ratio of from about 4:6 to 6:4 by weight.

8. A composition as claimed in claim 7, wherein components (a) and (b) are present in a ratio of from about 45:55 to 55:45 by weight.

9. A composition as claimed in claim 1, wherein each of components (a), (b) and (c) has a melting or softening point in the range of from 60° to 120° C.

* * * * *